US012775228B2

(12) United States Patent
Maeda et al.

(10) Patent No.: US 12,775,228 B2
(45) Date of Patent: Oct. 27, 2026

(54) FIXING DEVICE AND IMAGE FORMING APPARATUS

(71) Applicant: CANON KABUSHIKI KAISHA, Tokyo (JP)

(72) Inventors: Akihiro Maeda, Tokyo (JP); Ryo Yashiro, Tokyo (JP); Shigeaki Takada, Chiba (JP); Yusuke Yamaguchi, Chiba (JP); Madoka Watanabe, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/225,384

(22) Filed: Jun. 2, 2025

(65) Prior Publication Data

US 2026/0010102 A1 Jan. 8, 2026

(30) Foreign Application Priority Data

Jul. 3, 2024 (JP) ................................. 2024-107383

(51) Int. Cl.
*G03G 15/20* (2006.01)
*G03G 21/16* (2006.01)

(52) U.S. Cl.
CPC ..... *G03G 15/2025* (2013.01); *G03G 15/2017* (2013.01); *G03G 15/2064* (2013.01); *G03G 21/1685* (2013.01); *G03G 2215/20* (2013.01); *G03G 2215/2003* (2013.01);
(Continued)

(58) Field of Classification Search
CPC ........... G03G 15/2017; G03G 15/2025; G03G 15/2064; G03G 21/1685; G03G 2215/20; G03G 2215/2003; G03G 2215/2035; G03G 2215/2038; G03G 2215/2093
See application file for complete search history.

(56) References Cited

U.S. PATENT DOCUMENTS

2023/0229098 A1* 7/2023 Chikugo ............ G03G 15/2053 399/326
2024/0295843 A1* 9/2024 Tanaka ............... G03G 15/2064
2024/0310765 A1* 9/2024 Saito .................. G03G 15/2064

FOREIGN PATENT DOCUMENTS

JP 2003195671 A 7/2003

* cited by examiner

*Primary Examiner* — Joseph S Wong
(74) *Attorney, Agent, or Firm* — ROSSI, KIMMS & McDOWELL LLP

(57) ABSTRACT

A fixing device including: a rotatable endless belt member including a first surface that abuts on the recording material and a second surface opposite the first surface and to which a lubricant is applied; a nip forming member provided inside the belt member; a pressure rotating body configured to form a fixing nip portion that nips and conveys the recording material together with the belt member by pressurizing the nip forming member via the belt member; a rotating member configured to abut on the second surface of the belt member and rotate about a central portion in a width direction orthogonal to a conveyance direction of the recording material; and a lubricant recovery member that is provided at a position straddling at least both ends in the width direction of the belt member in the width direction, disposed to face the second surface of the belt member, and configured to abut on or separate from the second surface of the belt member according to a rotation angle when rotating about the central portion of the rotating member.

6 Claims, 15 Drawing Sheets

(52) U.S. Cl.
CPC ............... *G03G 2215/2035* (2013.01); *G03G 2215/2038* (2013.01); *G03G 2215/2093* (2013.01)

FIG 6

| IMAGE FORMING PPARATUS STATUS | STEER ANGLE (° ) | DEVIATION SPEED (mm/s) | TARGET OF BELT END POSITION |
|---|---|---|---|
| ON STANDBY | ±1.0 | 0.5 | MAINTAIN CENTER OF MOVING REGION R2 |
| WHEN PRINTING ON RECORDING MATERIAL LESS THAN 100 g/m$^2$ | ±1.5 | 0.7 | MAINTAIN CENTER OF MOVING REGION R2 |
| WHEN PRINTING ON RECORDING MATERIAL 101g/m$^2$ OR MORE | ±4.0 | 1.4 | RECIPROCATE BETWEEN OUTERMOST AND INNERMOST POSITIONS OF MOVING REGION R2 |

FIXING DEVICE AND IMAGE FORMING APPARATUS

BACKGROUND OF THE INVENTION

Field of the Invention

The present invention relates to a fixing device that fixes a toner image on a recording material, and an image forming apparatus including the fixing device.

Description of the Related Art

Conventionally, an image forming apparatus includes a fixing device that fixes an unfixed toner image on a recording material to the recording material. A fixing device described in Japanese Patent Application Laid-Open No. 2003-195671 includes a heating roller having a heating source for heating an unfixed toner image, a rotatable endless fixing belt to which heat is applied from the heating roller, and a pressure roller that pressurizes the fixing belt.

In such a fixing device, the heating roller is disposed inside the fixing belt to suspend the fixing belt. Further, the pressure roller is disposed outside the fixing belt and presses the pad member disposed inside the fixing belt via the fixing belt to form a fixing nip portion together with the fixing belt. Then, the recording material carrying the unfixed toner image is conveyed to the fixing nip portion, and heat and pressure are applied when the recording material is nipped and conveyed in the fixing nip portion. As a result, the toner image on the recording material is fixed to the recording material.

In addition, conventionally, a fixing device has been proposed in which the width of the fixing nip portion in the conveyance direction of the recording material is widened as the printing speed of the image forming apparatus is increased. By widening the width of the fixing nip portion in the conveyance direction of the recording material, the time for applying heat and pressure to the recording material in the fixing nip portion can be increased, and the toner image on the recording material can be reliably fixed to the recording material even when the speed is increased.

On the other hand, in a case where the width of the fixing nip portion in the conveying direction of the recording material is increased, the contact area between the pad member and the fixing belt is increased, and thus the sliding resistance is increased. Therefore, conventionally, there is known a fixing device having a configuration in which a lubricant is applied to an inner circumferential surface of a fixing belt to reduce sliding resistance between the fixing belt and a pad member.

SUMMARY OF THE INVENTION

A fixing device according to the present invention is a fixing device that fixes a toner image on a recording material, the fixing device including: a rotatable endless belt member including a first surface that abuts on the recording material and a second surface opposite the first surface and to which a lubricant is applied; a nip forming member provided inside the belt member; a pressure rotating body configured to form a fixing nip portion that nips and conveys the recording material together with the belt member by pressurizing the nip forming member via the belt member; a rotating member configured to abut on the second surface of the belt member and rotate about a central portion in a width direction orthogonal to a conveyance direction of the recording material; and a lubricant recovery member that is provided at a position straddling at least both ends in the width direction of the belt member in the width direction, disposed to face the second surface of the belt member, and configured to abut on or separate from the second surface of the belt member according to a rotation angle when rotating about the central portion of the rotating member.

Further features of the present invention will become apparent from the following description of exemplary embodiments with reference to the attached drawings.

BRIEF DESCRIPTION OF THE DRAWINGS

FIG. 6 is a diagram illustrating setting conditions of the fixing device according to the first embodiment of the present invention.

DESCRIPTION OF THE EMBODIMENTS

Figure 1:
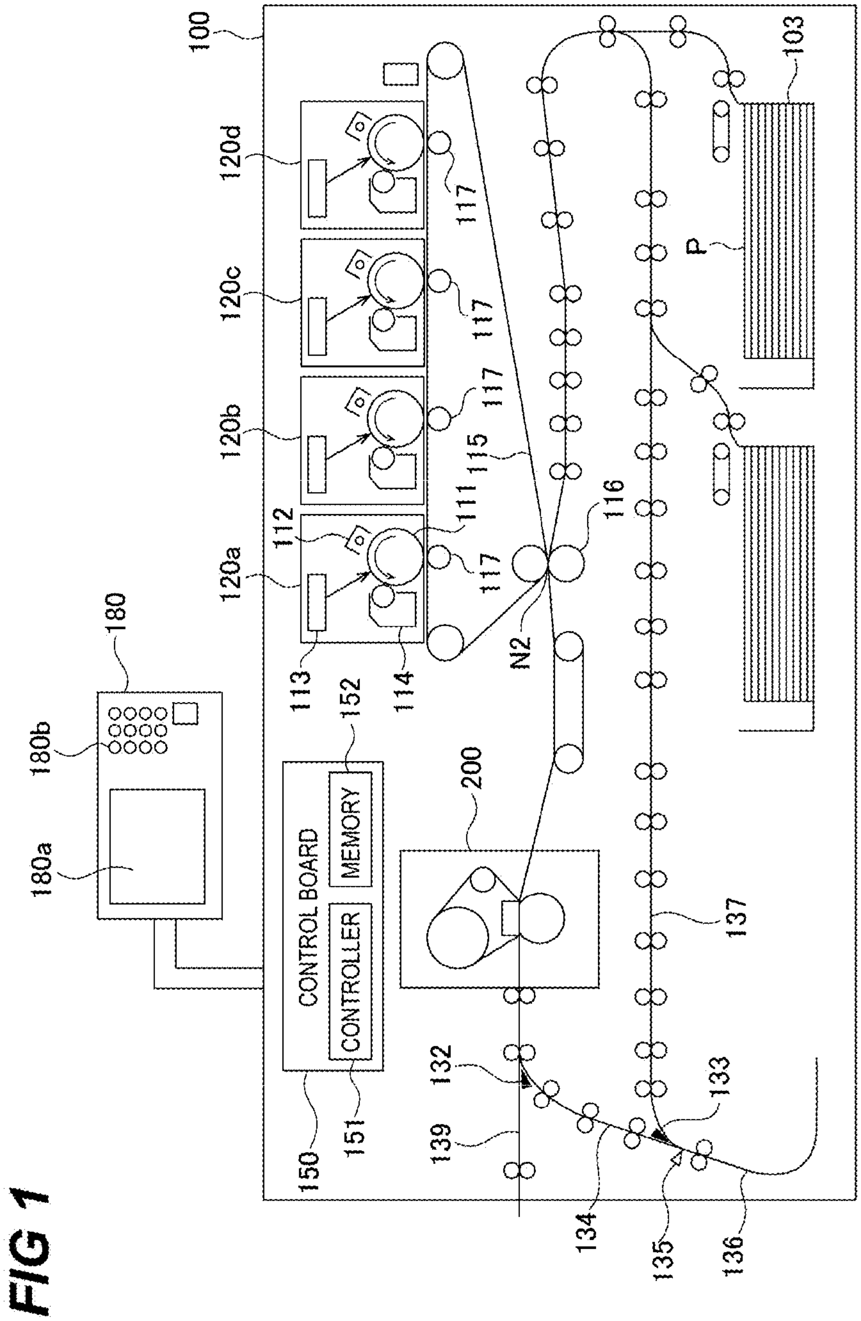
FIG. 1 is a schematic diagram of an image forming apparatus according to a first embodiment of the present invention.

Hereinafter, embodiments will be described in detail with reference to the drawings.

First Embodiment

<Configuration of Image Forming Apparatus>

A configuration of an image forming apparatus 100 according to a first embodiment of the present invention will be described in detail with reference to FIG. 1.

Here, the image forming apparatus 100 is exemplified by a full-color image forming apparatus. Specifically, the image forming apparatus 100 includes a recording material cassette 103, an intermediate transfer belt 115, a secondary transfer roller 116, a primary transfer roller 117, an image forming portion 120*a*, an image forming portion 120*b*, an image forming portion 120*c*, and an image forming portion 120*d*. The image forming apparatus 100 includes a flapper 132, a flapper 133, a reverse sensor 135, a control board 150, an operation portion 180, and a fixing device 200.

The intermediate transfer belt 115, the secondary transfer roller 116, the primary transfer roller 117, and the image forming portions 120*a*, 120*b*, 120*c*, and 120*d* constitute an image forming unit that forms a toner image on a recording material P and conveys the recording material P on which the toner image has been formed to the fixing device 200.

The recording material cassette 103 accommodates the recording material P.

On the intermediate transfer belt 115, toner images are sequentially primarily transferred from the photosensitive drums 111 of the image forming portion 120*a*, the image forming portion 120*b*, the image forming portion 120*c*, and the image forming portion 120*d* by the primary transfer roller 117, whereby a full-color toner image is formed. The intermediate transfer belt 115 conveys the formed toner image to the secondary transfer roller 116.

A pair of secondary transfer rollers 116 is provided. The secondary transfer rollers 116 abut on each other via the intermediate transfer belt 115 to form a secondary transfer portion N2. The secondary transfer roller 116 secondarily transfers the toner image formed on the intermediate transfer belt 115 to the recording material P taken out and fed one by one from the recording material cassette 103 in accordance with the conveyance timing of the toner image conveyed by the intermediate transfer belt 115.

The secondary transfer roller 116 secondarily transfers the toner image formed on the intermediate transfer belt 115 to the recording material P conveyed from a reverse path 137 in accordance with the conveyance timing of the toner image conveyed by the intermediate transfer belt 115. The secondary transfer roller 116 conveys the recording material P on which the toner image has been secondarily transferred to the fixing device 200.

The image forming portion 120*a*, the image forming portion 120*b*, the image forming portion 120*c*, and the image forming portion 120*d* are arranged along the moving direction of the intermediate transfer belt 115, whereby a full-color toner image is formed.

The image forming portion 120*a* forms a yellow toner image and transfers the formed yellow toner image to the intermediate transfer belt 115.

The image forming portion 120*b* forms a magenta toner image and transfers the formed magenta toner image to the intermediate transfer belt 115.

The image forming portion 120*c* forms a cyan toner image and transfers the formed cyan toner image to the intermediate transfer belt 115.

The image forming portion 120*d* forms a black toner image and transfers the formed black toner image to the intermediate transfer belt 115.

Each of the image forming portion 120*a*, the image forming portion 120*b*, the image forming portion 120*c*, and the image forming portion 120*d* includes a photosensitive drum 111, a charger 112, an exposure device 113, and a developing device 114.

The photosensitive drum 111 is rotationally driven by a drive motor (not illustrated).

The charger 112 uniformly charges the surface of the photosensitive drum 111.

The exposure device 113 forms an electrostatic latent image on the surface of the photosensitive drum 111 by irradiating the surface of the photosensitive drum 111 charged by the charger 112 with a laser according to image data input from a controller 151 described later of the control board 150.

The developing device 114 forms a toner image on the surface of the photosensitive drum 111 by supplying toner to the electrostatic latent image formed on the surface of the photosensitive drum 111 by the exposure device 113.

Each of the image forming portion 120*a*, the image forming portion 120*b*, the image forming portion 120*c*, and the image forming portion 120*d* includes a toner cleaner (not illustrated) that scrapes off the toner remaining on the surface of the photosensitive drum 111 without being transferred and removes the toner from the surface of the photosensitive drum 111.

The primary transfer roller 117 primarily transfers the toner image on the photosensitive drum 111 to the intermediate transfer belt 115 by applying a voltage having a potential polarity opposite to the potential polarity of the toner image to the intermediate transfer belt 115.

In a case where images are formed on both surfaces of the recording material P, the flapper 132 guides the recording material P on which transfer and fixing of the toner image onto the image forming first surface (first surface) of the recording material P has been completed to the conveyance path 134 and conveys the recording material P to a reverse portion 136 under the control of the controller 151 of the control board 150. The flapper 132 guides, to the discharge path 139, the recording material P on which image formation is performed only on one surface, or the recording material P on which image formation is performed on both surfaces of the recording material P and the transfer and fixing of the toner image onto the image formation second surface (second surface) of the recording material P is completed.

The flapper 133 performs switching such that the recording material P is conveyed from the reverse portion 136 to the reverse path 137 under the control of the controller 151 of the control board 150.

The reverse sensor 135 detects a rear end of the recording material P conveyed to the reverse portion 136 by the fixing device 200 in the conveyance direction, and outputs an electric signal corresponding to the detection result to the controller 151 of the control board 150.

The control board 150 controls the entire operation of the image forming apparatus 100 based on an electric signal input from the operation portion 180. The control board 150 includes a controller 151 and a memory 152.

The controller 151 controls the operation of the image forming apparatus 100 based on an electric signal input from a selection key 180*b* described later of the operation portion 180 and information data stored in the memory 152. The controller 151 performs control for displaying the state of the image forming apparatus 100 on a display screen 180*a* of the operation portion 180. In a case where the electric signal input from the reverse sensor 135 indicates the detection result of detecting the rear end of the recording material P in the conveyance direction, the controller 151 performs control to switch the flapper 133 such that the recording material P is conveyed from the reverse portion 136 to the reverse path 137. The controller 151 writes information data in the memory 152.

The memory 152 stores information data necessary for control by the controller 151.

The operation portion 180 includes the display screen 180*a* that displays a state of the image forming apparatus 100, and the selection key 180*b* that receives an instruction of an operation from an operator such as a user and outputs an electric signal corresponding to the received instruction to the control board 150.

The fixing device 200 applies heat and pressure to the recording material P conveyed by the secondary transfer roller 116 to fix the toner image secondarily transferred to the recording material P by the secondary transfer roller 116 to the recording material P. The fixing device 200 conveys the recording material P on which the toner image is fixed to the discharge path 139 and discharges the recording material P to a discharge tray (not illustrated). Note that details of the configuration of the fixing device 200 will be described later.

In the image forming apparatus 100 having the above configuration, a process from the charging process of charging the photosensitive drum 111 to the discharge of the recording material P on which the toner image is fixed is referred to as an image forming process (print job). In addition, the image forming apparatus 100 is in the middle of image forming processing (during print job) in a period in which image formation is performed.

Note that the image forming apparatus 100 is not limited to full-color image formation, and can perform monochrome image formation. When a monochrome image is formed, only the image forming portion 120*d* that forms a black toner image is driven.

<Configuration of Fixing Device>

A configuration of the fixing device 200 according to the first embodiment of the present invention will be described in detail with reference to FIGS. 2 to 4. The recording material P is conveyed in the left direction in FIG. 2. Here, the width direction (hereinafter, simply referred to as "width direction") orthogonal to the conveyance direction of the recording material P is a direction orthogonal to the paper surface in FIG. 2, and is a left-right direction in FIG. 4.

Figure 2:
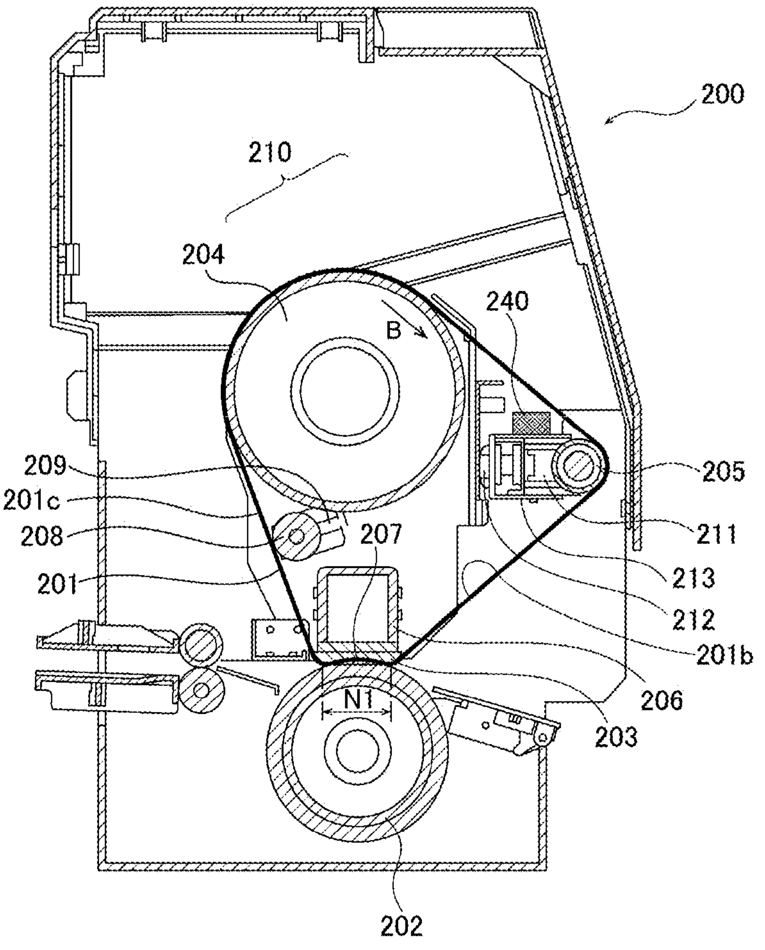
FIG. 2 is a cross-sectional view of a fixing device according to the first embodiment of the present invention.
Figure 4:
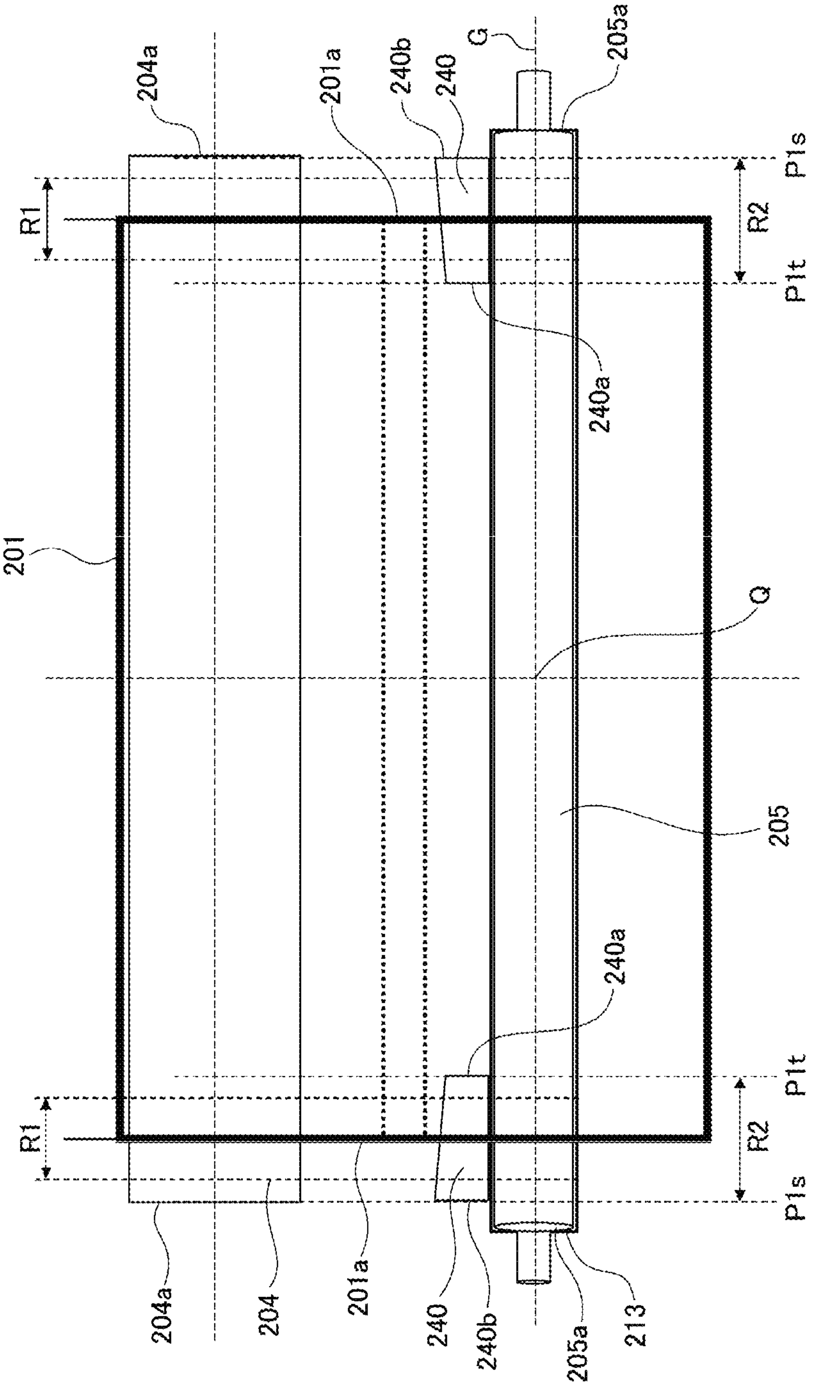
FIG. 4 is a schematic diagram of a part of the fixing device according to the first embodiment of the present invention.

Note that FIG. 4 is a diagram of the fixing device 200 illustrated in FIG. 2 as viewed obliquely from the upper right. Further, in FIG. 4, the steering roller 205 is actually covered with the fixing belt 201 at the center in the width direction, but for convenience of description, the entire steering roller 205 is exposed from the fixing belt 201. In FIG. 4, the heating roller 204 is actually covered with the fixing belt 201 at the center in the width direction, but for convenience of description, the entire heating roller 204 is exposed from the fixing belt 201. Further, in FIG. 4, the fixing belt 201, the heating roller 204, and the steering roller 205 rotate from the back side to the front side with respect to the paper surface.

The fixing device 200 includes a pressure roller 202, a stay 206, a heating unit 210, a spring 211, a steering frame 213, and an oil recovery member 240.

The pressure roller 202 as a pressure rotating body is a roller formed by laminating an elastic layer provided on the outer periphery of a shaft and a release layer provided on the outer periphery of the elastic layer. The shaft is made of stainless steel. The elastic layer has a thickness of 5 mm and is formed of conductive silicone rubber. The release layer has a thickness of 50 μm and is formed of PFA as a fluororesin.

The pressure roller 202 is rotatably supported by a fixing frame (not illustrated) of the fixing device 200. A gear (not illustrated) is fixed to one end of the pressure roller 202 in the longitudinal direction, and the pressure roller is connected to a drive source (not illustrated) via the gear. The pressure roller 202 is rotationally driven via the gear when the drive source is driven. The pressure roller 202 forms a fixing nip portion N1 by pressing a pad member 203 via a fixing belt 201 described later of the heating unit 210.

The stay 206 is disposed inside the fixing belt 201 of the heating unit 210, and is provided on a side of the pad member 203 of the heating unit 210 opposite to a side where the sliding sheet 207 is provided. The stay 206 is provided to back up the pad member 203, and is a reinforcing member having rigidity with the width direction as the longitudinal direction.

When the pad member 203 is pressed by the pressure roller 202, the stay 206 prevents the deflection of the pad member 203 to secure the pressure in the fixing nip portion N1. The stay 206 is made of a pull-out material of SUS304 having a wall thickness of 3 mm, and has a hollow inside and is formed to have a square cross section to secure strength. The material of the stay 206 is not limited to stainless steel as long as the strength can be secured, and may be other than stainless steel.

The heating unit 210 includes a heat source and heats the recording material P at the fixing nip portion N1. The heating unit 210 includes a fixing belt 201, a pad member 203, a heating roller 204, a steering roller 205, a sliding sheet 207, an oil applying roller 208, and a pressing spring 209.

The fixing belt 201 as a belt member has a three-layer structure in which a base layer, an elastic layer covering an outer periphery of the base layer, and a release layer covering an outer periphery of the elastic layer are laminated. The base layer has a thickness of 60 μm and is made of polyimide resin (PI). The elastic layer has a thickness of 300 μm and is made of silicone rubber. The release layer has a thickness of 30 μm and is made of PFA (tetrafluoroethylene-perfluoroalkoxyethylene copolymer resin) as a fluororesin.

The fixing belt 201 has thermal conductivity, heat resistance, and the like, and has a thin cylindrical shape with the width direction as the longitudinal direction. The fixing belt 201 is stretched by the pad member 203, the heating roller 204, and the steering roller 205. The fixing belt 201 stores heat from the heating roller 204 by being heated by the heating roller 204.

The fixing belt 201 is endless and rotatable, and is sandwiched between the pressure roller 202 and the pad member 203 at the fixing nip portion N1, thereby being driven to rotate in the B direction of FIG. 2 when the pressure roller 202 rotates. The fixing belt 201 includes an outer circumferential surface 201*c* as a first surface abutting on the recording material P at the fixing nip portion N1, and an inner circumferential surface 201*b* as a second surface opposite to the outer circumferential surface 201*c*. Oil S is applied to the inner circumferential surface 201*b* of the fixing belt 201 by the oil applying roller 208. The force applied to the fixing belt 201 at the fixing nip portion N1 is exemplified here as about 2000 N.

The pad member 203 as a nip forming member is provided inside the fixing belt 201 to suspend the fixing belt 201. The pad member 203 is a member that is in press contact with the pressure roller 202 via the fixing belt 201 to form the fixing nip portion N1 having a predetermined width in the conveyance direction of the recording material P. The pad member 203 has a substantially rectangular cross section with the width direction as the longitudinal direction. The pad member 203 is made of a material having heat resistance, and is made of, for example, liquid crystal polymer (LCP) resin.

The heating roller 204 is a stainless pipe having a thickness of 1 mm with the width direction as the longitudinal direction. The heating roller 204 includes a halogen heater (not illustrated) inside, and can generate heat to a predetermined temperature by the halogen heater. The heating roller 204 is provided inside the fixing belt 201 to suspend the fixing belt 201.

The length of the heating roller 204 in the width direction is larger than the length of the fixing belt 201 in the width direction.

An end 204*a* of the heating roller 204 in the width direction is located outside in the width direction than the end 201*a* of the fixing belt 201 in the width direction (see FIG. 4). The length of the heating roller 204 in the width direction is not limited to be larger than the length of the fixing belt 201 in the width direction, and may be the same length as the length of the fixing belt 201 in the width direction.

The steering roller 205 as a rotating member has the width direction as the longitudinal direction, is provided inside the fixing belt 201 to suspend the fixing belt 201, and is rotatably supported by the steering frame 213. The steering roller 205 is biased to the fixing belt 201 by the spring 211 supported by the steering frame 213, and also serves as a tension roller that applies a predetermined tension to the fixing belt 201. The steering roller 205 abuts on the inner circumferential surface 201*b* of the fixing belt 201 by being biased to the fixing belt 201 by the spring 211.

The steering roller 205 rotates together with the steering frame 213 about a rotation shaft 212 whose axial direction is the conveyance direction of the recording material P, thereby performing a steering operation in which both ends 205*a* in the width direction swing in a vertical direction (vertical direction in FIG. 2). That is, the steering roller 205 performs a steering operation of rotating about a central portion Q (see FIG. 4) in the width direction of the steering roller 205.

The steering roller 205 performs a steering operation to move the fixing belt 201 in the width direction. The length of the steering roller 205 in the width direction is larger than the length of the fixing belt 201 in the width direction, and is equal to the length of the heating roller 204 in the width direction. The end 205*a* of the steering roller 205 is located outside the end 201*a* of the fixing belt 201 in the width direction.

The length of the steering roller 205 in the width direction and the length of the heating roller 204 in the width direction are not limited to the same size, and may be different sizes. The length of the steering roller 205 in the width direction is not limited to be larger than the length of the fixing belt 201 in the width direction, and may be the same length as the length of the fixing belt 201 in the width direction.

The sliding sheet 207 is provided between the fixing belt 201 and the pad member 203. The sliding sheet 207 is formed by coating a surface of a polyimide base material having a thickness of 70 μm with PTFE.

The oil applying roller 208 is formed by impregnating a roll-shaped member around which a nonwoven fabric having a thickness of 100 μm is wound with the oil S such as silicone oil as a lubricant. The oil applying roller 208 is rotatably supported by a frame (not illustrated) of the heating unit 210. The oil applying roller 208 abuts on the inner circumferential surface 201*b* of the fixing belt 201 to supply the oil S to the inner circumferential surface 201*b* of the fixing belt 201.

The pressing spring 209 biases the oil applying roller 208 so that the oil applying roller 208 abuts on the inner circumferential surface 201*b* of the fixing belt 201. Here, 3.0 N is exemplified as the contact force of the oil applying roller 208 with respect to the inner circumferential surface 201*b* of the fixing belt 201.

The spring 211 is supported by the steering frame 213, and biases the steering roller 205 against the inner circumferential surface 201*b* of the fixing belt 201 so that the fixing belt 201 has a predetermined tension.

The steering frame 213 as a holding member rotates with respect to the frame of the heating unit 210 about the rotation shaft 212 as a rotation center to change alignment of the steering roller 205 with respect to other suspension members. The steering frame 213 changes the alignment of the steering roller 205 with respect to the other suspension member to generate a tension difference between one end side and the other end side in the width direction of the fixing belt 201, and controls the position of the fixing belt 201 in the width direction.

The oil recovery member 240 as a lubricant recovery member is a sheet member in which aramid fibers are felted. The oil recovery member 240 has, for example, a length of 15 mm in the lateral direction (left-right direction in FIG. 2) and a length of 30 mm in the longitudinal direction (direction orthogonal to the paper surface in FIG. 2). The oil recovery member 240 is attached to a positioning member (not illustrated) fixed to an upper portion of the steering frame 213.

The oil recovery member 240 is disposed facing the inner circumferential surface 201*b* of the fixing belt 201. The oil recovery member 240 abuts on or separated from the inner circumferential surface 201*b* of the fixing belt 201 according to a rotation angle (hereinafter, referred to as "steer angle") with respect to the width direction when rotating about the central portion Q in the width direction of the steering roller 205. Specifically, the oil recovery member 240 is separated from the inner circumferential surface 201*b* of the fixing belt 201 in a case where the steer angle is less than a predetermined angle, and abuts on the inner circumferential surface 201*b* of the fixing belt 201 in a case where the steer angle is a predetermined angle or more.

A pair of oil recovery members 240 is provided at positions straddling both ends 201*a* of the fixing belt 201 in the width direction. Note that the oil recovery member 240 is not limited to the configuration in which a pair is provided, and may be one member that straddles both ends 201*a* of the fixing belt 201 in the width direction.

The oil recovery member 240 is provided so as to be able to abut on the fixing belt 201 in a contact region R2 between a start point P1*s* and an end point P1*t*. Here, the start point P1*s* is a position outside the fixing belt 201 in the width direction and is a position corresponding to the end 204*a* of the heating roller 204. In addition, the end point P1*t* is a position closer to the center than the end 201*a* of the fixing belt 201 in the width direction. The oil recovery member 240 is provided so as to be able to abut on the fixing belt 201 in the contact region R2, and thus, is provided at a position straddling a movement range R1 in the width direction of each of both ends 201*a* of the fixing belt 201 in the width direction.

Although the oil S is used as the lubricant in the fixing device 200 having the above configuration, the invention is not limited thereto, and grease or the like may be used as the lubricant.

In addition, the sliding sheet 207 is used to improve the slidability between the pad member 203 and the fixing belt 201, but the present invention is not limited thereto, and coating or the like for improving the slidability may be applied to the surface layer of the pad member 203 that abuts on the fixing belt 201.

Further, the heating roller 204 may be configured to be rotationally driven. In this case, when the heating roller 204 rotates at a rotation speed faster than the rotation speed of the pressure roller 202, the tension of the fixing belt 201 from the fixing nip portion N1 to the heating roller 204 can be increased in the rotation direction of the fixing belt 201. As a result, the curvature of the outlet of the fixing nip portion N1 can be increased in the rotation direction of the fixing belt 201, and the separation performance of the recording material P can be improved.

<Basic Operation of Fixing Device>

A basic operation of the fixing device 200 according to the first embodiment of the present invention will be described in detail with reference to FIGS. 2 to 4.

The heating roller 204 is controlled such that the fixing belt 201 has a predetermined target temperature corresponding to the sheet type based on the temperature of the fixing device 200 detected by a thermistor (not illustrated) indicated by an electric signal input from the thermistor to the controller 151.

The fixing belt 201 is heated by the heating roller 204.

Then, when the recording material P carrying the unfixed toner image is nipped and conveyed by the pressure roller 202 and the heated fixing belt 201 at the fixing nip portion N1, heat and pressure necessary for fixing are applied to the recording material P. As a result, the unfixed toner image on the recording material P is fixed to the recording material P. At this time, the fixing belt 201 can smoothly slide with respect to the pad member 203 by interposing the sliding sheet 207 and the oil S between the fixing belt and the pad member 203.

Here, the oil S applied between the pad member 203 and the fixing belt 201 deteriorates with the operation of the fixing device 200 and decreases by leaking to the outside or the like. When the oil S cannot be held between the pad member 203 and the fixing belt 201, the sliding resistance between the pad member 203 and the fixing belt 201 increases, and a problem such as a driven rotation failure of the fixing belt 201 may occur.

On the other hand, when the oil applying roller 208 abuts on the inner circumferential surface 201*b* of the fixing belt 201, the oil S can be supplied to the inner circumferential surface 201*b* of the fixing belt 201. As a result, the oil S interposed between the fixing belt 201 and the pad member 203 (sliding sheet 207) can be maintained for a longer time, and the stable operation of the fixing device 200 can be maintained.

Further, when the unfixed toner image is fixed on the recording material P, a portion of the fixing belt 201 which is in contact with the edge which is an end of the recording material P in the width direction is subjected to a larger stress than a portion of the fixing belt 201 which is not in contact with the edge of the recording material P. A region through which the edge of the recording material P of the fixing belt 201 repeatedly passes has a recessed shape as compared with a region of the fixing belt 201 not in contact with the edge of the recording material P. The recess generated in the fixing belt 201 by the edge of the recording material P in this manner is referred to as a paper edge damage.

When pressure and heat are applied to the recording material P in order to fix the unfixed toner image on the recording material P in the fixing device 200, the state of the fixing belt 201 is reflected on the gloss of the surface of the image fixed to the recording material P. In a case where the fixing belt 201 has unevenness, the state of the unevenness of the fixing belt 201 is reflected on the gloss of the surface of the image to be fixed on the recording material P. Therefore, gloss unevenness occurs on the surface of the image fixed to the recording material P. Therefore, in a case where the unfixed toner image is fixed on the recording material P in a state where the fixing belt 201 has a paper edge damage, gloss unevenness in which a straight line is drawn on the surface of the image fixed to the recording material P occurs.

Therefore, in order to suppress the paper edge damage of the fixing belt 201, the fixing belt 201 is reciprocated in the width direction by the steering roller 205. As a result, it is possible to reduce the recording material P repeatedly passing through the same position of the fixing belt 201, and it is possible to suppress the paper edge damage generated in the fixing belt 201. As described above, the steering roller 205 also plays a role of suppressing gloss unevenness due to the edge of the recording material P.

The position of the fixing belt 201 in the width direction is detected by a belt position detection portion (not illustrated). Specifically, the belt position detection portion includes an arm that rotates about a rotation axis whose axial direction is a direction orthogonal to the width direction and the conveyance direction of the fixing belt 201. The arm of the belt position detection portion rotates about the rotation axis to apply a force in a direction from the outside to the inside to the end 201*a* of the fixing belt 201.

The belt position detection portion detects a position in the width direction of the arm abutting on the end 201*a* of the fixing belt 201 by a sensor such as a photointerrupter, and outputs an electric signal corresponding to the detection result to the controller 151. As a result, the controller 151 can ascertain the position of the fixing belt 201 in the width direction.

Based on the detection result indicated by the electric signal input from the belt position detection portion, the controller 151 performs steering control for causing the steering roller 205 to perform a steering operation of rotating and swinging with the rotation shaft 212 as a rotation center. As a result, it is possible to prevent the fixing belt 201 from coming off from the pad member 203 that suspends the fixing belt 201, the heating roller 204, and the steering roller 205. In addition, the fixing belt 201 can be moved in the width direction in order to take measures against the edge damage.

<Oil Recovery Operation of Fixing Device>

The oil recovery operation of the fixing device 200 according to the first embodiment of the present invention will be described in detail with reference to FIGS. 2 to 10.

Figure 7:
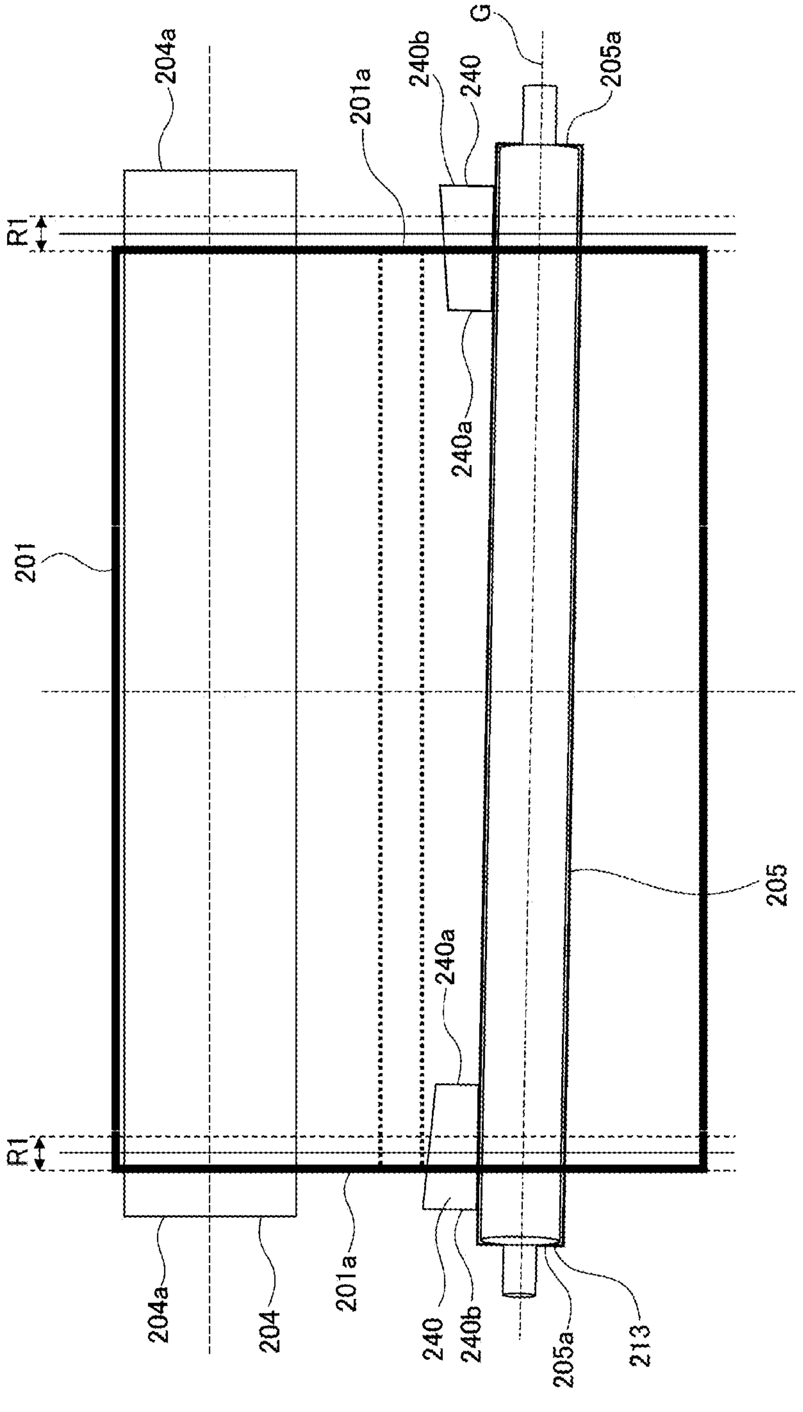
FIG. 7 is a schematic diagram in a case where a steer angle of a part of the fixing device according to the first embodiment of the present invention is small.
Figure 8:
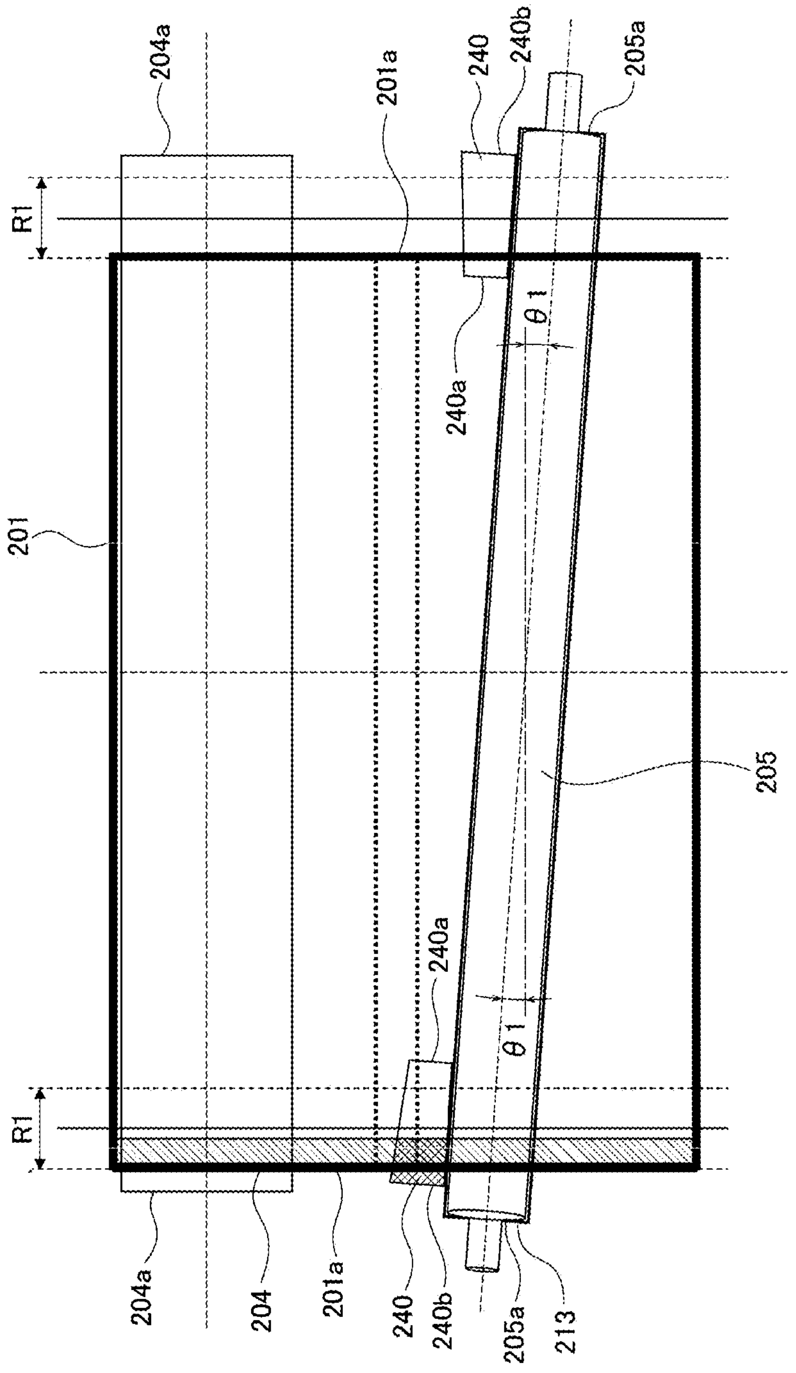
FIG. 8 is a schematic diagram in a case where a steer angle of a part of the fixing device according to the first embodiment of the present invention is large.

Note that FIGS. 7 and 8 are diagrams of the fixing device 200 illustrated in FIG. 2 as viewed obliquely from the upper right. Further, in FIGS. 7 and 8, the steering roller 205 is actually covered with the fixing belt 201 at the center in the width direction orthogonal to the conveying direction of the recording material P, but for convenience of description, the entire steering roller 205 is exposed from the fixing belt 201. Further, in FIGS. 7 and 8, the heating roller 204 is actually covered with the fixing belt 201 at the center in the width direction orthogonal to the conveying direction of the recording material P, but for convenience of description, the entire heating roller 204 is exposed from the fixing belt 201.

Since the pressing force is generated by the pad member 203 and the pressure roller 202 at the fixing nip portion N1 with respect to the oil S applied to the inner circumferential surface 201*b* of the fixing belt 201, a force pushed out from the inner circumferential surface 201*b* acts at the fixing nip portion N1. As a result, in a case where the oil recovery member 240 is not provided, the oil S is exposed to both ends 201*a*, end surfaces, or regions outside both ends 201*a* in the width direction of the fixing belt 201.

The oil S exposed in the region outside both ends 201*a* of the fixing belt 201 adheres to the end 204*a* of the heating roller 204 as the fixing belt 201 rotates.

There is a possibility that the oil S adhering to the end 204*a* of the heating roller 204 may adhere to the outer circumferential surface 201*c* of the fixing belt 201 as the fixing belt 201 reciprocates in the width direction by the steering operation of the steering roller 205.

Then, the oil S adhering to the outer circumferential surface 201*c* of the fixing belt 201 reaches the fixing nip portion N1 as the fixing belt 201 rotates in the B direction of FIG. 2. The oil S that has reached the fixing nip portion N1 adheres to the recording material P conveyed to the fixing nip portion N1. In this case, the region of the recording material P to which the oil S adheres becomes a fixing failure in which heat transfer is hindered and the toner is not sufficiently melted, or an image failure such as gloss unevenness due to a change in gloss feeling caused by the oil S.

In addition, since the fixing device 200 aggressively reciprocates the fixing belt 201 in the width direction by the steering roller 205 in order to suppress the paper edge damage of the fixing belt 201, the exposure of the oil S is promoted.

Here, the material conveyed in contact with the roller has a characteristic of being conveyed in a direction perpendicular to the rotation axis of the roller. For example, in a case where the state of FIG. 4 in which the direction of the rotation axis G of the steering roller 205 is parallel to the width direction is changed to the state of FIG. 7 in which the left side of the steering roller 205 in FIG. 4 is lifted upward, the fixing belt 201 can be moved to the left side in FIG. 7. In addition, in a case where the right side of the steering roller 205 in FIG. 4 is lifted upward with respect to the rotation shaft 212 from a state where the axial direction of the steering roller 205 is parallel to the width direction, the fixing belt 201 can be moved to the right side in FIG. 7.

At this time, as the steer angle θ1 (see FIG. 8) of the steering roller 205 increases, the force for moving the fixing belt 201 in the width direction increases. In addition, as the steer angle θ1 increases, the moving velocity (hereinafter, referred to as "deviation speed") of the fixing belt 201 in the width direction also increases. As the deviation speed of the fixing belt 201 increases, the force of sweeping the oil S on the surface of the heating roller 204 increases and the frequency of sweeping the oil S also increases, so that the oil S is more exposed in the regions of both ends 204*a* of the heating roller 204.

Figure 5:
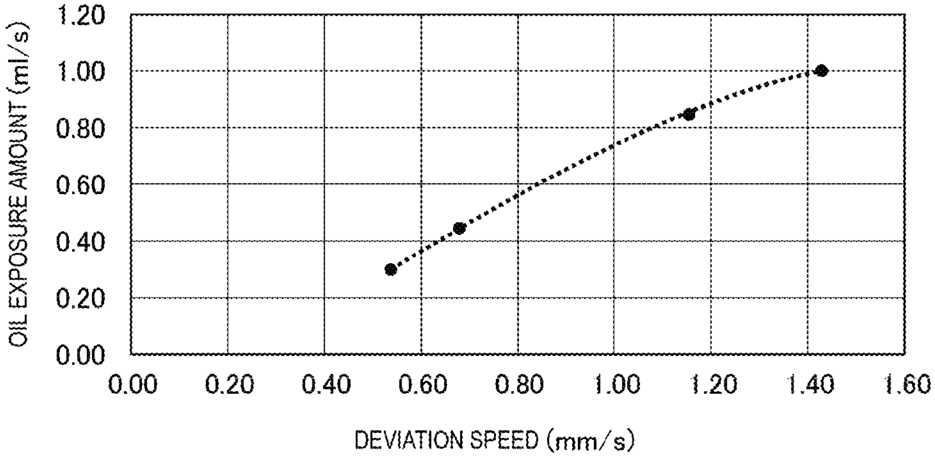
FIG. 5 is a diagram illustrating a relationship between a deviation speed and an oil exposure amount in the fixing device according to the first embodiment of the present invention.

FIG. 5 illustrates a result of confirming the relationship between the deviation speed and the oil exposure amount for each steer angle θ1. In FIG. 5, the operation speed of the fixing device 200 is set to 630 mm/s in a state where the pad member 203 is pressurized by the pressure roller 202 in the fixing nip portion N1, and the temperature adjustment temperature of the heating roller 204 is set to 190° C., and idle rotation is performed for 1 hour.

Further, the steer angle θ1 was set to ±1.0°, ±1.5°, ±3.0°, and ±4.0°. Based on a detection result of an arm (not illustrated) that detects a position of the fixing belt 201 in the width direction, the steering operation was performed so that the fixing belt 201 reciprocates in the maximum width in the movement range R1. The oil exposure amount on the vertical axis in FIG. 5 is the amount per unit time of the oil that is exposed and dripped from the end of the fixing belt 201 when the fixing device 200 is idly rotated.

Here, "+" of the steer angle θ1 is the steer angle θ1 when the one end 205*a* of the steering roller 205 moves upward or downward. Further, "−" of the steer angle θ1 is the steer angle θ1 when the one end 205*a* of the steering roller 205 moves downward or upward.

From FIG. 5, the deviation speed was set to 0.54 mm/s when the steer angle θ1 was ±1.0°, and the deviation speed was set to 1.43 mm/s when the steer angle θ1 was ±4.0°. As a result, it has been confirmed that the deviation speed increases as the steer angle θ1 increases, and the oil exposure amount increases accordingly.

As described above, in order to suppress the edge damage due to sheet passing of the recording material P, the steering operation is essential. However, when the steering operation is aggressively performed, an adverse effect that an image defect occurs due to adhesion of the oil S to the recording material P occurs. On the other hand, measures such as bringing an oil exposure regulating mechanism that suppresses adhesion of the oil S to the outer circumferential surface 201*c* of the fixing belt 201 abuts on the inner circumferential surface 201*b* of the fixing belt 201 and the like can be considered. However, in this case, the wear of the abutting portion between the oil exposure regulating mechanism and the fixing belt 201 is promoted.

In addition, in a case where the oil exposure restriction is excessively performed, the effect of reducing the sliding resistance, which is the original purpose of the oil S, is hindered, and adverse effects such as a driven rotation failure of the fixing belt 201 occur.

In view of the above problem, the fixing device 200 of the present embodiment can suppress the oil S from flowing around the outer circumferential surface 201*c* of the fixing belt 201 while performing the steering operation, and can also suppress wear of the fixing belt 201.

Specifically, in a case of standby from power-on of the image forming apparatus 100 to reception of an image forming processing (print job) command, as illustrated in FIG. 7, the steering control is performed such that the direction of the rotation axis G of the steering roller 205 and the width direction are substantially parallel. Accordingly, the fixing belt 201 can be prevented from coming off. For example, in the case of standby, as illustrated in FIG. 6, the deviation speed becomes 0.5 mm/s by setting the steer angle θ1 to ±1.0.

In addition, in a case where the image forming processing (print job) is executed on the recording material P of less than 100 g/$m^2$, even if the edge of the recording material P repeatedly passes through the same position of the fixing belt 201, the risk of damaging the fixing belt 201 is small. Therefore, also in this case, as illustrated in FIG. 7, the steering control is performed such that the direction of the rotation axis G of the steering roller 205 and the width direction are substantially parallel.

When the steering control is performed such that the direction of the rotation axis G of the steering roller 205 is substantially parallel to the width direction, the steer angle θ1 is set to ±1.0 to 1.5° so that the fixing belt 201 repeats movement within a narrow range in the width direction, whereby the deviation speed becomes 0.5 to 0.7 mm/s. The end 201*a* of the fixing belt 201 is located at a substantially central portion in the width direction of the movement range R1.

When the steer angle θ1 is set to ±1 to 1.5°, the oil recovery member 240 moves up and down by about 5 mm, but does not abut on the inner circumferential surface 201*b* of the fixing belt 201. For example, in a case where the steering control is performed such that the direction of the rotation axis G of the steering roller 205 and the width direction are substantially parallel to each other, as illustrated in FIG. 6, the steer angle θ1 is set to ±1.5, whereby the deviation speed becomes 0.7 mm/s.

Next, in a case where the image forming processing (print job) is executed on the recording material P of 101 $g/m^2$ or more, it is necessary to prevent edge damage on the fixing belt 201. Therefore, in this case, as illustrated in FIG. 8, the steering control is performed such that both ends 201*a* of the fixing belt 201 reciprocate in the movement range R1 having the maximum width so that the edge of the recording material P does not pass through the same position of the fixing belt 201.

In a case where the steering control is performed such that both ends 201*a* of the fixing belt 201 reciprocate in the movement range R1 having the maximum width, the steer angle θ1 is set to ±4°, whereby the deviation speed becomes 1.4 mm/s. For example, in a case where the steering control is performed such that both ends 201*a* of the fixing belt 201 reciprocate in the movement range R1 having the maximum width, as illustrated in FIG. 6, the deviation speed becomes 1.4 mm/s by setting the steer angle θ1 to ±4.0.

As described above, the deviation speed in a case where the image forming processing (print job) is executed on the recording material P of 101 $g/m^2$ or more is faster than the deviation speed in a case of standby or in a case where the image forming processing (print job) is executed on the recording material P of 100 $g/m^2$ or less.

The oil recovery member 240 moves up and down by about 12 mm when the steer angle θ1 is ±4°. As a result, the oil recovery member 240 on the one end 205*a* side of the steering roller 205 abuts on the inner circumferential surface 201*b* of the fixing belt 201 as the one end 205*a* side of the steering roller 205 moves in a direction approaching the fixing belt 201.

On the other hand, the oil recovery member 240 on the other end 205*a* side of the steering roller 205 does not abut on the inner circumferential surface 201*b* of the fixing belt 201 as the other end 205*a* side of the steering roller 205 moves in a direction away from the fixing belt 201. As a result, the oil recovery member 240 on the one end 205*a* side of the steering roller 205 collects the oil S adhering to the inner circumferential surface 201*b* on the one end 201*a* side of the fixing belt 201.

The oil recovery member 240 on the other end 205*a* side of the steering roller 205 abuts on the inner circumferential surface 201*b* of the fixing belt 201 as the other end 205*a* side of the steering roller 205 moves in a direction approaching the fixing belt 201. On the other hand, the oil recovery member 240 on the one end 205*a* side of the steering roller 205 does not abut on the inner circumferential surface 201*b* of the fixing belt 201 as the one end 205*a* side of the steering roller 205 moves in a direction away from the fixing belt 201. As a result, the oil recovery member 240 on the other end 205*a* side of the steering roller 205 collects the oil S adhering to the inner circumferential surface 201*b* on the other end 201*a* side of the fixing belt 201.

In this manner, each of the oil recovery members 240 recovers the oil S on the one end 201*a* side of the fixing belt 201 and then recovers the oil S on the other end 201*a* side of the fixing belt 201 by the steering operation of the steering roller 205.

Figure 10:
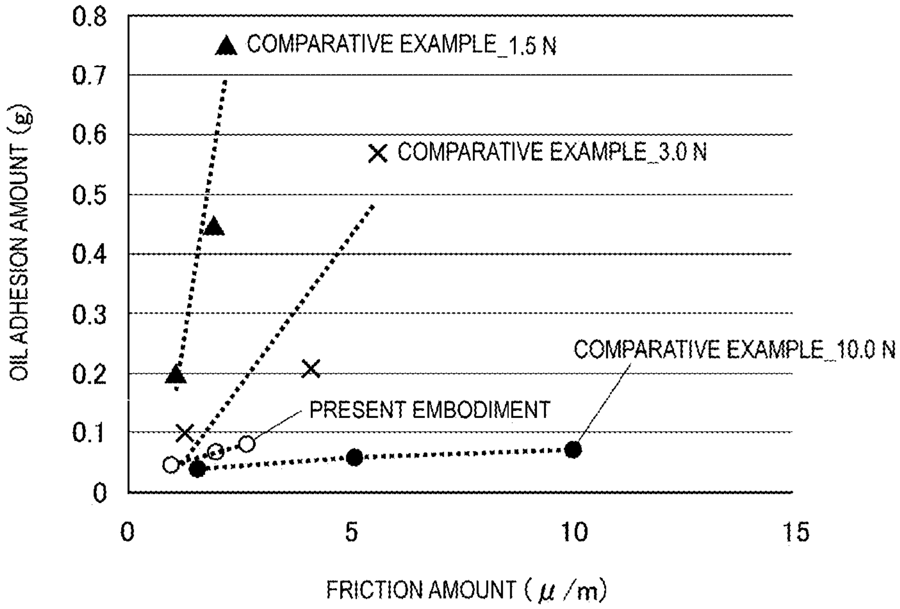
FIG. 10 is a diagram illustrating a relationship between an oil adhesion amount and a wear amount in the fixing device according to the first embodiment of the present invention.

FIG. 10 illustrates a confirmation result obtained by confirming the relationship between the adhesion amount of the oil S on the outer circumferential surface 201*c* of the fixing belt 201 and the wear amount of the inner circumferential surface 201*b* of the fixing belt 201 when the fixing device 200 is idly rotated in a state where the pad member 203 is pressurized by the pressure roller 202.

Figure 9:
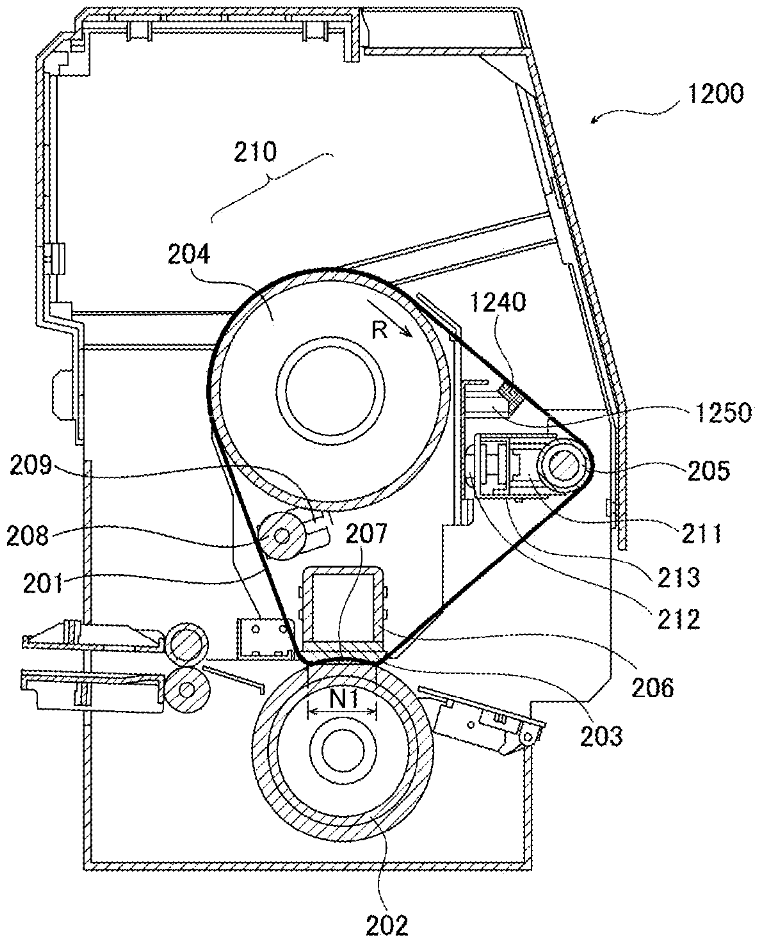
FIG. 9 is a cross-sectional view of a fixing device of a comparative example compared with the fixing device according to the first embodiment of the present invention.

In FIG. 10, a fixing device 1200 having the configuration illustrated in FIG. 9 is illustrated as a comparative example to be compared with the fixing device 200 of the present embodiment. The fixing device 1200 illustrated in FIG. 9 of the comparative example has a configuration in which an oil recovery member 1240 always abuts on the fixing belt 201 by a pressing member 1250. The oil recovery member 240 and the oil recovery member 1240 are made of the same material, and are attached to the inner circumferential surface 201*b* of the fixing belt 201 at substantially the same position in the width direction. In addition, the pressing pressure of the oil recovery member 1240 of the comparative example against the fixing belt 201 was changed, and the pressing pressure of the oil recovery member 240 of the present embodiment against the fixing belt 201 was set to about 7.0 N.

Further, in FIG. 10, the fixing device 200 and the fixing device 1200 of the comparative example are idly rotated at 630 mm/s, the temperature adjustment temperature of the heating roller 204 is set to 175° C., and the steering operation is performed so that the movement amount of the fixing belt 201 in the width direction is maximized.

Under the above conditions, the relationship between the adhesion amount of the oil S adhering to the outer circumferential surface 201*c* of the fixing belt 201 and the wear amount of the inner circumferential surface 201*b* of the fixing belt 201 after 1 hour, 10 hours, and 20 hours from the start of the idle rotation operation was confirmed.

As can be seen from FIG. 10, in the comparative example, in a case where the contact pressure of the oil recovery member 1240 with respect to the fixing belt 201 is set to 10.0 N, the oil adhesion amount on the outer circumferential surface 201*c* of the fixing belt 201 can be suppressed to 0.1 g or less even after the lapse of 20 hours. On the other hand, in the comparative example, the inner circumferential surface 201*b* of the fixing belt 201 was worn by 10 μm.

Furthermore, in the comparative example, as the contact pressure of the oil recovery member 1240 with respect to the fixing belt 201 was reduced to 3.0 N and 1.5 N, the wear amount of the inner circumferential surface 201*b* of the fixing belt 201 decreased, while the oil adhesion amount of the outer circumferential surface 201*c* of the fixing belt 201 increased. As described above, in the comparative example, the wear amount of the inner circumferential surface 201*b* of the fixing belt 201 and the oil adhesion amount of the outer circumferential surface 201*c* of the fixing belt 201 are in a trade-off relationship.

On the other hand, in the present embodiment, even when the sweeping of the oil S having the large steer angle θ1 and the high deviation speed is promoted, the oil adhesion amount on the outer circumferential surface 201*c* of the fixing belt 201 can be suppressed. In the present embodiment, since one of the oil recovery members 240 facing both ends 201*a* of the fixing belt 201 do not abut on the inner circumferential surface 201*b* of the fixing belt 201, wear of the inner circumferential surface 201*b* of the fixing belt 201 can also be suppressed. In the present embodiment, when the steer angle θ1 is small and the deviation speed is small, the oil recovery member 240 does not abut on the fixing belt 201 due to the small sweeping of the oil S. Therefore, wear of the inner circumferential surface 201*b* of the fixing belt 201 can be further suppressed.

As described above, in the present embodiment, the edge damage can be suppressed by the steering operation, and the degradation of the image quality due to the adhesion of the oil S to the outer circumferential surface 201*c* of the fixing belt 201 can be suppressed. In addition, it is possible to suppress a decrease in durability of the fixing belt 201 due to the abutment of the oil recovery member 240.

In the present embodiment, the oil recovery member 240 is provided at a position straddling at least both ends 201*a* in the width direction of the fixing belt 201 in the width direction. The oil recovery member 240 is disposed facing the inner circumferential surface 201*b* of the fixing belt 201, and abuts on or separated from the inner circumferential surface 201*b* of the fixing belt 201 according to a steer angle when the steering roller 205 rotates about the central portion Q in the width direction. As a result, it is possible to suppress the oil S from adhering to the outer circumferential surface 201*c* of the fixing belt 201, and thus, it is possible to suppress the adhesion of the oil S to the recording material P and to suppress deterioration of image quality.

Second Embodiment

Since the configuration of the image forming apparatus according to a second embodiment of the present invention is the same as that of FIG. 1, the description thereof will be omitted.

<Configuration of Fixing Device>

A configuration of fixing device 300 according to the second embodiment of the present invention will be described in detail with reference to FIGS. 11 to 13. The recording material P is conveyed in the left direction in FIG. 11.

Figure 3:
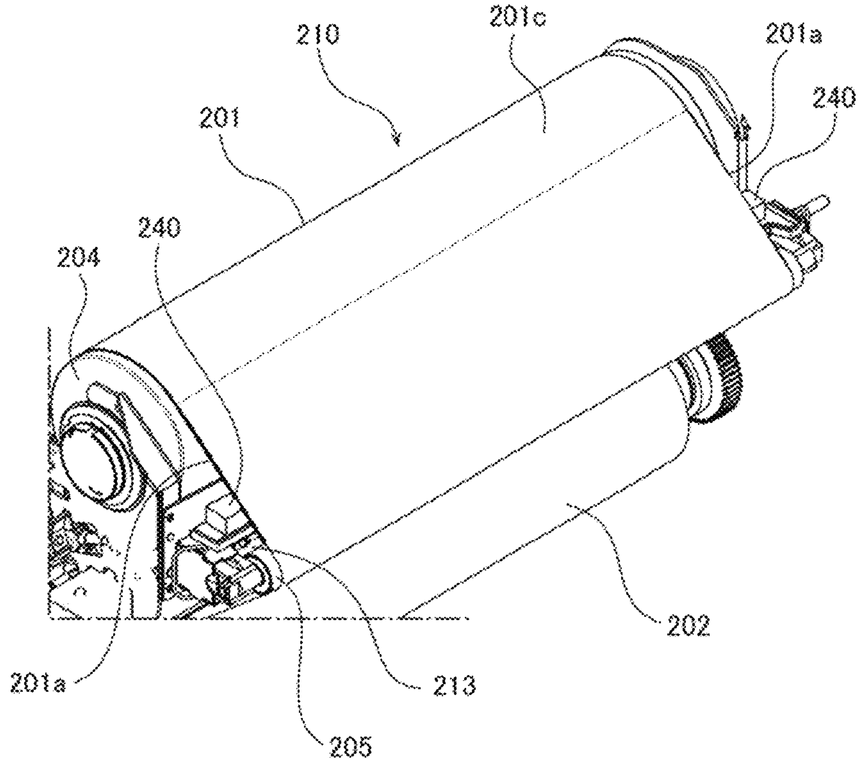
FIG. 3 is a perspective view of a part of the fixing device according to the first embodiment of the present invention.
Figure 11:
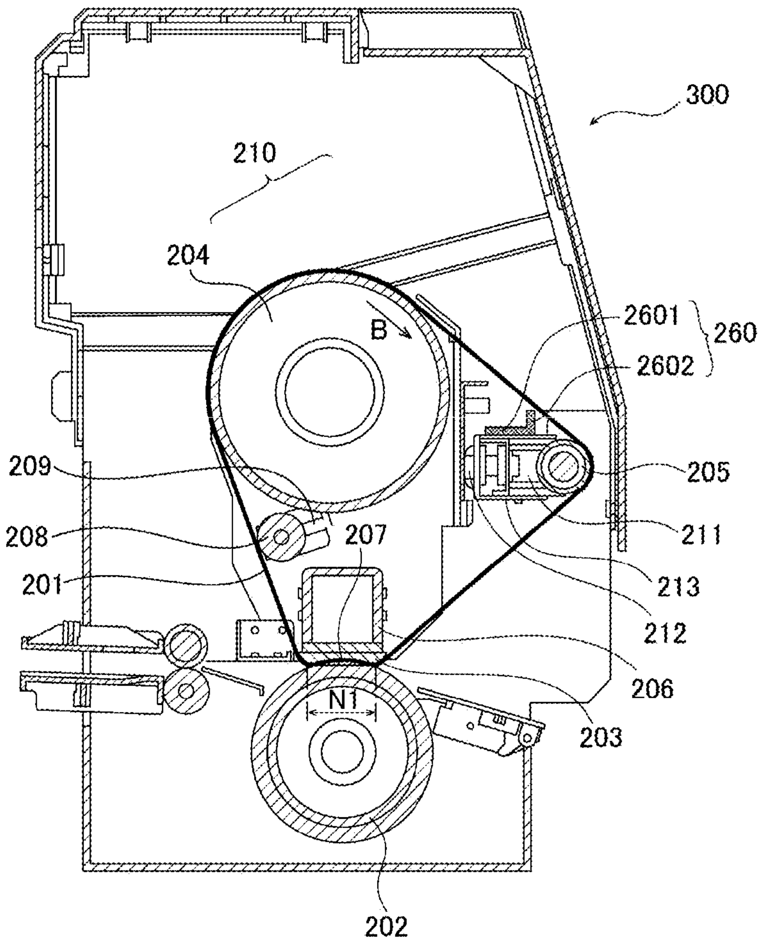
FIG. 11 is a cross-sectional view of a fixing device according to a second embodiment of the present invention.
Figure 12:
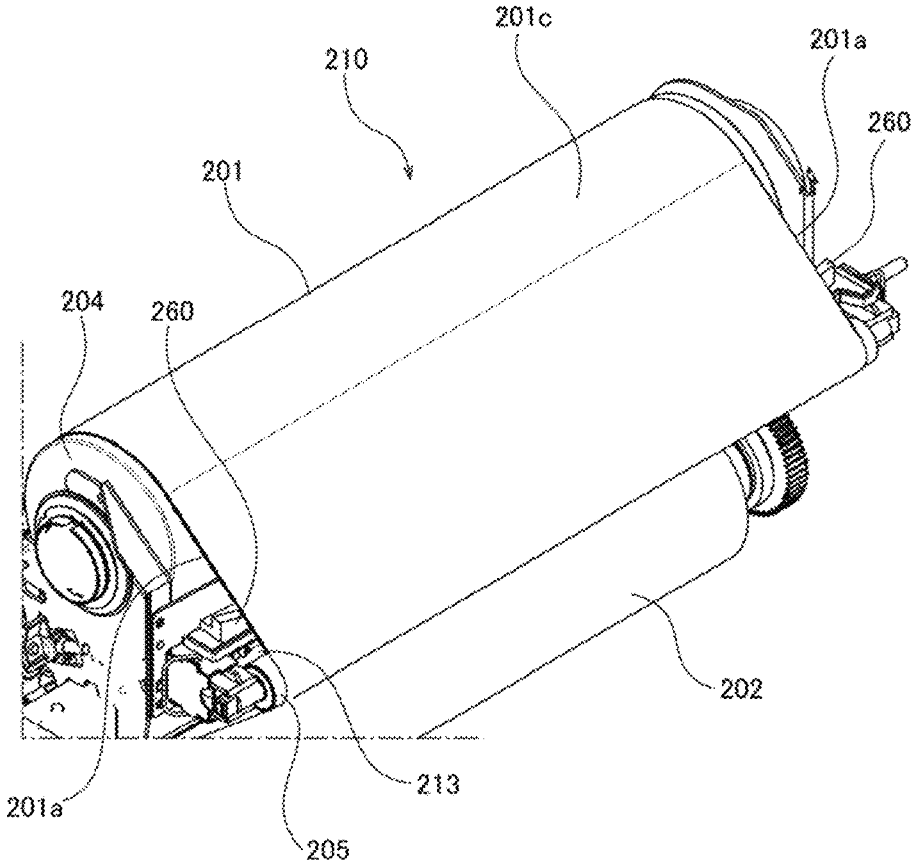
FIG. 12 is a perspective view of a part of the fixing device according to the second embodiment of the present invention.
Figure 13:
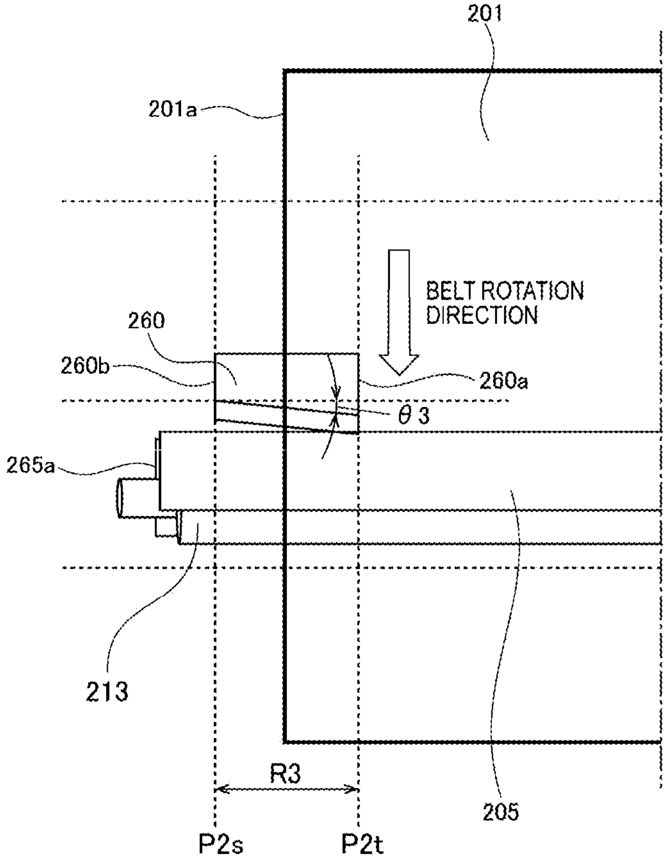
FIG. 13 is an enlarged schematic view of a part of the fixing device according to the second embodiment of the present invention.

In FIGS. 11 to 13, parts having the same configurations as those in FIGS. 2 to 4 are denoted by the same reference numerals, and the description thereof will be omitted. In addition, FIG. 13 is a diagram of the fixing device 300 illustrated in FIG. 11 as viewed obliquely from the upper right. Further, in FIG. 13, the steering roller 205 is actually covered with the fixing belt 201 at the center in the width direction, but for convenience of description, the entire steering roller 205 is exposed from the fixing belt 201. Further, in FIG. 13, the fixing belt 201 and the steering roller 205 rotate from the back side to the front side with respect to the paper surface.

The fixing device 300 includes a pressure roller 202, a stay 206, a heating unit 210, a spring 211, a steering frame 213, and an oil recovery member 260.

The oil recovery member 260 is a rubber sheet member such as a fluororubber sheet. The oil recovery member 260 has, for example, a length of 15 mm in the lateral direction (left-right direction in FIG. 11) and a length of 30 mm in the longitudinal direction (direction orthogonal to the paper surface in FIG. 11). The oil recovery member 260 includes a base 2601 and a protrusion 2602. The base 2601 is attached to a positioning member (not illustrated) fixed to an upper portion of the steering frame 213. The protrusion 2602 protrudes upward from one end in the lateral direction of the base 2601 and faces the inner circumferential surface 201*b* of the fixing belt 201. The length of the protrusion 2602 in the lateral direction is smaller than the length of the base 2601 in the lateral direction.

A pair of oil recovery members 260 is provided at positions straddling both ends 201*a* of the fixing belt 201 in the width direction. Note that the oil recovery member 260 is not limited to the configuration in which a pair is provided, and may be one member that straddles both ends 201*a* of the fixing belt 201 in the width direction.

The oil recovery member 260 is in contact with the fixing belt 201 in a contact region R3 between a start point P2*s* and an end point P2*t*. Here, the start point P2*s* is a position outside the fixing belt 201 in the width direction and is a position of the end 204*a* of the heating roller 204. Further, the end point P2*t* is a position closer to the center than the end 201*a* of the fixing belt 201 in the width direction. The oil recovery member 260 is provided so as to be in contact with the fixing belt 201 in the contact region R3, and thus, is provided at a position straddling the movement range R1 in the width direction of each of both ends 201*a* of the fixing belt 201 in the width direction.

The protrusion 2602 of the oil recovery member 260 is provided to have a predetermined angle θ3 with respect to the width direction by being inclined downstream in the rotation direction of the fixing belt 201 toward the central portion in the width direction of the fixing belt 201. The oil recovery member 260 has a predetermined angle θ3 with respect to the width direction by being disposed such that the end 260*a* on the end point P2*t* side is located downstream of the end 260*b* on the start point P2*s* side in the rotation direction of the fixing belt 201. The predetermined angle θ3 is exemplified here as 10 degrees.

Although the start point P2*s* is located at the position corresponding to the position of the end 204*a* of the heating roller 204 in the width direction, the present invention is not limited thereto, and the start point P2*s* may be located outside the end 204*a* of the heating roller 204 in the width direction. In this case, the end 260*b* of the oil recovery member 260 is positioned outside the heating roller 204 in the width direction.

The oil recovery member 260 regulates movement of the oil S from the inner circumferential surface 201*b* of the fixing belt 201 so that the oil S adhering to the inner circumferential surface 201*b* of the fixing belt 201 does not adhere to the outer circumferential surface 201*c* of the fixing belt 201.

Although the oil S is used as the lubricant in the fixing device 300 having the above configuration, the invention is not limited thereto, and grease or the like may be used as the lubricant. Since the basic operation of the fixing device 300 is the same as the basic operation of the fixing device 200, the description thereof will be omitted.

<Oil Recovery Operation of Fixing Device>

The oil recovery operation of the fixing device 300 according to the second embodiment of the present invention will be described in detail with reference to FIGS. 11 to 15.

The oil recovery member 260 moves up and down by about ±5 mm when the steer angle θ1 is set to ±1 to 1.5°, but does not abut on the inner circumferential surface 201*b* of the fixing belt 201. The oil recovery member 260 moves up and down by about ±12 mm when the steer angle θ1 is set to ±4°.

In a case where the steer angle θ1 is set to ±4°, the oil recovery member 260 on the one end 205*a* side moves in a direction in which on the one end 205*a* side of the steering roller 205 approaches the fixing belt 201, so that the oil recovery member abuts on the inner circumferential surface 201*b* of the fixing belt 201. On the other hand, the oil recovery member 260 on the other end 205*a* side does not abut on the inner circumferential surface 201*b* of the fixing belt 201 as the other end 205*a* side of the steering roller 205 moves in a direction away from the fixing belt 201. As a result, the oil recovery member 260 on the one end 205*a* side of the steering roller 205 collects the oil S adhering to the inner circumferential surface 201*b* on the one end 201*a* side of the fixing belt 201.

Subsequently, in a case where the steer angle θ1 is set to ±4°, the oil recovery member 260 on the other end 205*a* side moves in a direction in which the other end 205*a* side of the steering roller 205 approaches the fixing belt 201, so that the oil recovery member abuts on the inner circumferential surface 201*b* of the fixing belt 201. On the other hand, the oil recovery member 260 on the one end 205*a* side does not abut on the inner circumferential surface 201*b* of the fixing belt 201 as the one end 205*a* side of the steering roller 205 moves in a direction away from the fixing belt 201. As a result, the oil recovery member 260 on the other end 205*a* side of the steering roller 205 collects the oil S adhering to the inner circumferential surface 201*b* on the other end 201*a* side of the fixing belt 201.

In this manner, each of the oil recovery members 260 recovers the oil S on the one end 201*a* side of the fixing belt 201 and then recovers the oil S on the other end 201*a* side of the fixing belt 201 by the steering operation of the steering roller 205.

In the above operation, the oil recovery member 260 is provided at a predetermined angle θ3 with respect to the width direction, so that the oil S can flow from the end 260*b* on the start point P2*s* side toward the end 260*a* on the end point P2*t* side along with the rotation of the fixing belt 201. As a result, the oil S adhering to the vicinity of the end 201*a* of the inner circumferential surface 201*b* of the fixing belt 201 can flow to the central portion side in the width direction of the fixing belt 201, so that the oil S can be prevented from accumulating in the vicinity of the end 204*a* of the surface of the heating roller 204.

Figure 15:
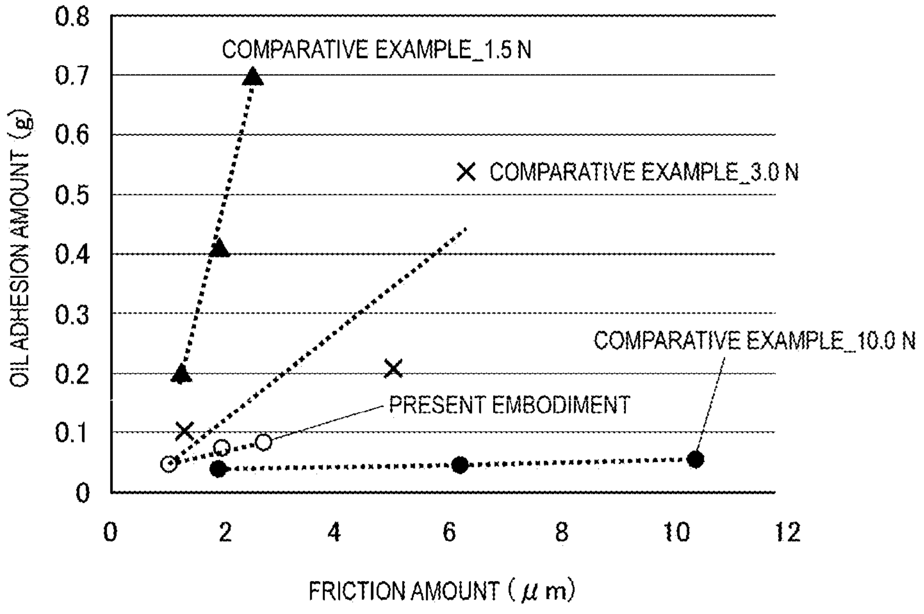
FIG. 15 is a diagram illustrating a relationship between an oil adhesion amount and a wear amount in the fixing device according to the second embodiment of the present invention.

FIG. 15 illustrates a confirmation result obtained by confirming the relationship between the adhesion amount of the oil S on the outer circumferential surface 201*c* of the fixing belt 201 and the wear amount of the inner circumferential surface 201*b* of the fixing belt 201 when the fixing device 300 is idly rotated in a state where the pad member 203 is pressurized by the pressure roller 202.

Figure 14:
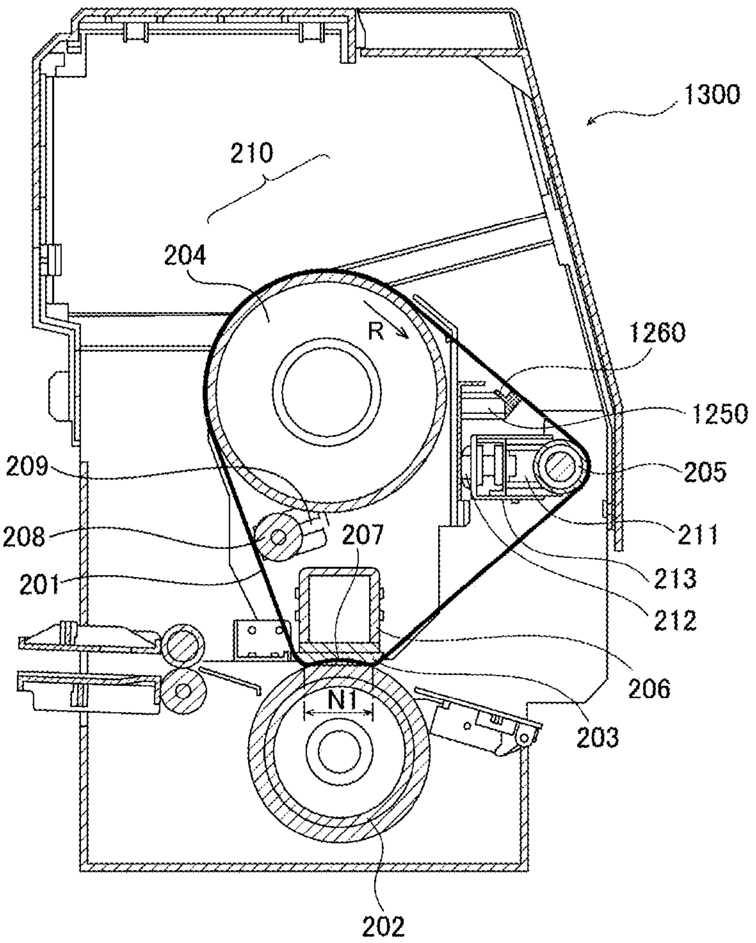
FIG. 14 is a cross-sectional view of a fixing device of a comparative example compared with the fixing device according to the second embodiment of the present invention.

In FIG. 15, a fixing device 1300 having the configuration illustrated in FIG. 14 is illustrated as a comparative example to be compared with the fixing device 300 of the present embodiment. The fixing device 1300 illustrated in FIG. 14 of the comparative example has a configuration in which the oil recovery member 1260 always abuts on the fixing belt 201 by the pressing member 1250. The oil recovery member 260 and the oil recovery member 1260 are made of the same material and have the same shape, and are attached to the inner circumferential surface 201*b* of the fixing belt 201 at the same position in the width direction. In addition, the pressing pressure of the oil recovery member 1260 of the comparative example against the fixing belt 201 was changed, and the pressing pressure of the oil recovery member 260 of the present embodiment against the fixing belt 201 was set to about 7.0 N.

Conditions other than the mentioned above were the same as those in the case of FIG. 10. Under these conditions, the relationship between the adhesion amount of the oil S adhering to the outer circumferential surface 201*c* of the fixing belt 201 and the wear amount of the inner circumferential surface 201*b* of the fixing belt 201 after 1 hour, 10 hours, and 20 hours from the start of the idle rotation operation was confirmed.

From FIG. 15, in the comparative example, similarly to FIG. 10, the wear amount of the inner circumferential surface 201*b* of the fixing belt 201 and the oil adhesion amount of the outer circumferential surface 201*c* of the fixing belt 201 are in a trade-off relationship. On the other hand, in the present embodiment, similarly to FIG. 10, even when the sweeping of the oil S having the large steer angle θ1 and the high deviation speed is promoted, the oil adhesion amount on the outer circumferential surface 201*c* of the fixing belt 201 can be suppressed. In the present embodiment, since one of the oil recovery members 260 facing both ends 201*a* of the fixing belt 201 does not abut on the inner circumferential surface 201*b* of the fixing belt 201, wear of the inner circumferential surface 201*b* of the fixing belt 201 can also be suppressed.

In the present embodiment, when the steer angle θ1 is small and the deviation speed is small, sweeping of the oil S is small, and thus the oil recovery member 260 does not abut on the fixing belt 201. Therefore, wear of the inner circumferential surface 201*b* of the fixing belt 201 can be further suppressed.

According to the present embodiment, it is possible to achieve suppression of the edge damage caused by the steering operation, suppression of the degradation of the image quality due to the exposure of the oil S to the outer circumferential surface 201*c* of the fixing belt 201, and suppression of the degradation of the durability of the fixing belt 201 due to the abutment of the oil recovery member 240.

In the present embodiment, the oil recovery member 260 is provided at a position straddling at least both ends 201*a* in the width direction of the fixing belt 201 in the width direction. The oil recovery member 260 is disposed facing the inner circumferential surface 201*b* of the fixing belt 201, and abuts on or separated from the inner circumferential surface 201*b* of the fixing belt 201 according to a steer angle when the steering roller 205 rotates about the central portion Q in the width direction. As a result, it is possible to suppress the oil S from adhering to the outer circumferential surface 201*c* of the fixing belt 201, and thus, it is possible to suppress the adhesion of the oil S to the recording material P and to suppress deterioration of image quality.

It goes without saying that the present invention is not limited to the above embodiment, and various modifications can be made without departing from the gist of the present invention.

Specifically, in the first embodiment and the second embodiment, the inner circumferential surface 201*b* of the fixing belt 201 is heated, but the invention is not limited thereto, and the outer circumferential surface 201*c* of the fixing belt 201 may be heated.

In the first and second embodiments, the fixing belt 201 is moved in the width direction, but the present invention is not limited thereto, and the fixing belt 201 may not be moved in the width direction when the recording material P having the maximum size is conveyed.

In the first embodiment and the second embodiment, the oil recovery member 240 is provided in the steering frame 213 that rotatably supports the steering roller 205. However, the present invention is not limited thereto, and the oil recovery member may be provided on a member that rotatably supports a rotating member other than the steering roller 205 that rotates up and down about the central portion in the width direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-107383, filed Jul. 3, 2024, which is hereby incorporated by reference herein in its entirety.

What is claimed is:

1. A fixing device that fixes a toner image on a recording material, the fixing device comprising:

a rotatable endless belt member including a first surface that abuts on the recording material and a second surface opposite the first surface and to which a lubricant is applied;

a nip forming member provided inside the belt member;

a pressure rotating body configured to form a fixing nip portion that nips and conveys the recording material together with the belt member by pressurizing the nip forming member via the belt member;

a rotating member configured to abut on the second surface of the belt member and rotate about a central portion in a width direction orthogonal to a conveyance direction of the recording material; and a lubricant recovery member that is provided at a position straddling at least both ends in the width direction of the belt member in the width direction, disposed to face the second surface of the belt member, and configured to abut on or separate from the second surface of the belt member according to a rotation angle when rotating about the central portion of the rotating member.

2. The fixing device according to claim 1, wherein the rotating member is a steering roller that moves the belt member in the width direction by rotating around the central portion.

3. The fixing device according to claim 1, wherein the lubricant recovery member is provided on a holding member that rotatably holds the rotating member and rotates about the central portion together with the rotating member.

4. The fixing device according to claim 1, wherein the belt member is movable in the width direction, and the lubricant recovery member is provided at a position straddling a movement range in the width direction of each of both ends of the belt member in the width direction.

5. The fixing device according to claim 1, wherein the lubricant recovery member is inclined downstream in a rotation direction of the rotating member toward a central portion in the width direction of the belt member.

6. An image forming apparatus comprising:

the fixing device according to claim 1; and an image forming unit configured to form a toner image on a recording material and convey the recording material on which the toner image has been formed to the fixing device.

* * * * *